(12) United States Patent
Fazekas et al.

(10) Patent No.: US 6,696,827 B2
(45) Date of Patent: Feb. 24, 2004

(54) MAGNETIC STUD LOCATOR ADAPTED TO PROVIDE VISUAL REFERENCE POINT

(76) Inventors: Craig Fazekas, 39 Varda Landing Rd., Sausalito, CA (US) 94965; Collin Bernsen, 8003 Jovenita Canyon Rd., Los Angeles, CA (US) 90046

( * ) Notice: Subject to any disclaimer, the term of this patent is extended or adjusted under 35 U.S.C. 154(b) by 0 days.

(21) Appl. No.: 09/972,230

(22) Filed: Oct. 5, 2001

(65) Prior Publication Data

US 2003/0067292 A1 Apr. 10, 2003

(51) Int. Cl.⁷ .............................................. G01R 19/00
(52) U.S. Cl. ...................................... 324/67; 324/228
(58) Field of Search .................. 324/67, 228; 273/239; 40/621; 335/302, 303; 446/129, 132, 137, 138, 139

(56) References Cited

U.S. PATENT DOCUMENTS

| | | |
|---|---|---|
| 3,845,384 A | 10/1974 | Stoutenberg |
| 4,700,489 A | 10/1987 | Vasile |
| 4,896,131 A | 1/1990 | Podlesny et al. |
| 5,148,108 A | 9/1992 | Dufour |
| D339,074 S | 9/1993 | Dufour |
| 6,229,294 B1 * | 5/2001 | Wun ........................... 324/67 |

* cited by examiner

*Primary Examiner*—Walter E. Snow
(74) *Attorney, Agent, or Firm*—Stetina Brunda Garred & Brucker

(57) ABSTRACT

A device for locating a metallic stud disposed within a wall. The device comprises an elongate housing which itself comprises a base portion defining a generally planar contact surface and a handle portion which extends from the base portion. In addition to the housing, the device comprises at least one magnet which defines a generally planar attraction surface. The magnet is disposed within the base portion of the housing such that the attraction surface extends in generally parallel relation to the contact surface. The magnet and the housing are sized relative to each other such that the force of magnetic attraction between the magnet and the stud when the device is oriented in a particular location upon the wall is sufficient to maintain the device thereon without external support.

11 Claims, 2 Drawing Sheets

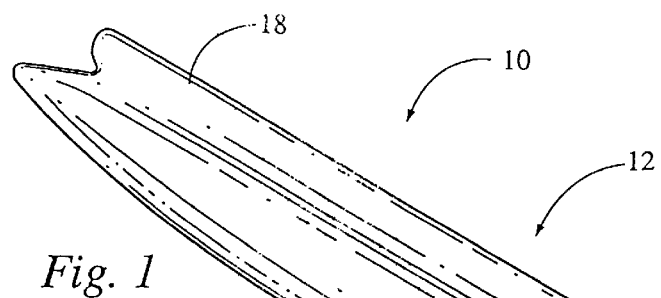
Fig. 1
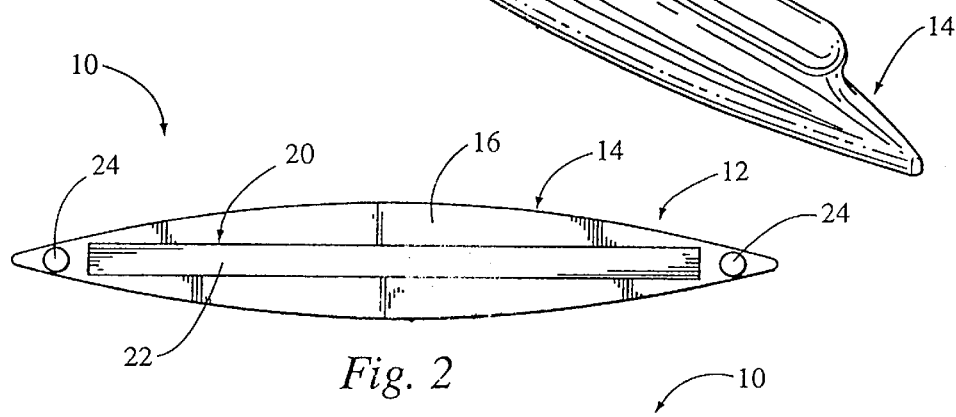
Fig. 2
Fig. 3
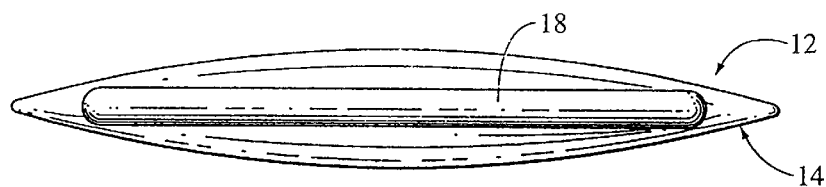
Fig. 4
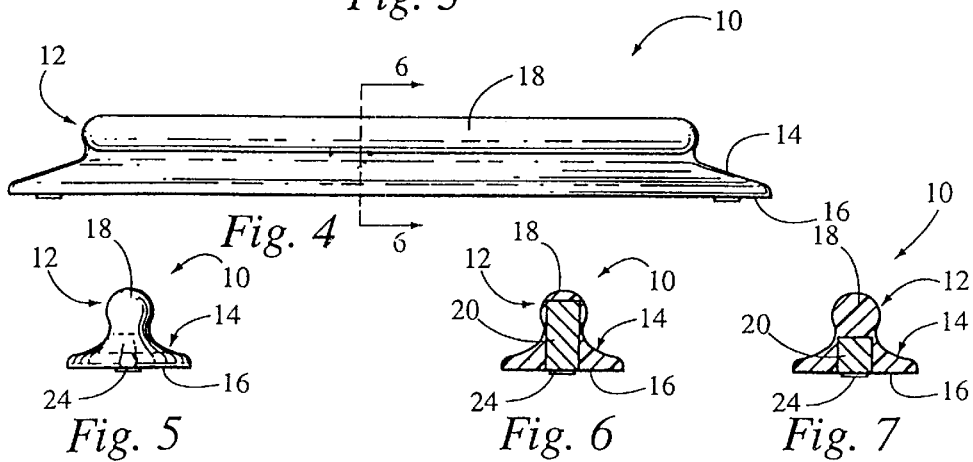
Fig. 5    Fig. 6    Fig. 7

MAGNETIC STUD LOCATOR ADAPTED TO PROVIDE VISUAL REFERENCE POINT

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to magnets, and more particularly to a magnetic locator device suited for determining the location of embedded metallic objects such as wall studs, and providing a visual reference point corresponding to the location of such objects.

There is known in the prior art numerous stud finder devices which employ the use of a magnet to determine the location of a fully or partially embedded metallic object, such as a metal wall stud or a nail. Examples of such prior art stud finders are found in U.S. Pat. No. 3,845,384 entitled STUD FINDER, U.S. Pat. No. 4,700,489 entitled SQUARE LEVEL MEASURING TOOL, U.S. Pat. No. 4,896,131 entitled STUD FINDER WITH ONE-PIECE MAGNET ASSEMBLY, U.S. Pat. No. 5,148,108 entitled STUD FINDER WITH LEVEL INDICATOR, and D339,074 entitled STUD FINDER. In each of these prior art references, a relatively small, cylindrically configured magnet is pivotally or rotatably connected to a housing. When the housing is placed upon a surface such as a wall, and is not in close proximity to a metallic object such as a nail or a metal wall stud, the magnet typically extends along a first axis which extends in non-perpendicular relation to the wall. As the stud finder is slid along the surface of the wall to a location over a nail or an embedded metal wall stud, the force of magnetic attraction between the magnet and the nail or metal wall stud facilitates the pivotal movement of the magnet to a position whereat it extends along a second axis which is generally perpendicular to the wall, thus providing a visual indication that the stud finder is located over the nail or embedded metal wall stud. At this point, a scribe, pencil or other marking device is used to make a mark on the wall indicative of the location of the nail or metal wall stud.

Though the above-described stud finders are generally suitable for determining the location of a fully or partially embedded metal object, they possess certain deficiencies which detract from their overall utility. More particularly, as indicated above, the size of the magnet included in such prior art stud finders is relatively small, with the size being limited to the minimum needed to exert a level of magnetic force sufficient to cause the magnet to be pivoted to extend along an alternative axis once moved into a location adjacent or in close proximity to a metal object. Thus, the small size of the magnet is wholly insufficient to maintain the stud finder upon the vertical wall surface or a ceiling without external support. Indeed, as also indicated above, a scribe, pencil or other marking device must typically be used with such prior art stud finders to provide a permanent visual reference point corresponding to the location of the underlying metal object.

As will be recognized, it is oftentimes desirable to view the location of an underlying wall stud or ceiling joist from different, remote perspectives around the room. For example, if a picture is to be hung on the wall or a light fixture hung from the ceiling, it is often desirable to get a visual "feel" from a distance as to how the picture or light fixture may look upon installation if positioned in a location wherein a hanger device may be interfaced directly to the underlying wall stud or ceiling joist. A small mark created by a scribe or a pencil is typically insufficient to provide a visual point of reference from any distance exceeding a few feet.

The present invention addresses this deficiency in prior art stud finders by providing a magnetic locating device which is specifically adapted to exert a force of magnetic attraction against a metallic object such as an underlying metal wall stud or ceiling joist which is sufficient to maintain the device in a prescribed position upon a support surface such as a wall or ceiling. Thus, in addition to being operative to assist in locating a metallic stud or joist embedded within a wall or ceiling behind at least one layer of drywall, plywood or other building material, the present locating device is further operative to provide an easily discernable visual reference point observable from virtually any location within the room. These, as well as other features of the present invention, will be discussed in more detail below.

BRIEF SUMMARY OF THE INVENTION

In accordance with the present invention, there is provided a device for locating a metallic stud disposed within a wall. The device comprises an elongate housing which is preferably fabricated from a lightweight material, e.g., plastic, wood, aluminum, etc. The housing itself comprises a base portion which defines a generally planar contact surface, and a handle portion which is integrally connected to and extends along the base portion. The base portion and contact surface defined thereby each have a generally oval shape. The handle portion itself is generally cylindrically shaped with a circular cross-sectional configuration.

In addition to the housing, the locating device comprises at least one magnet which defines a generally planar attraction surface. The magnet is disposed within the base portion of the housing such that the attraction surface extends in generally parallel relation to the contact surface. More particularly, the magnet is preferably disposed within the base portion such that the attraction surface is substantially flush with (i.e., extends in generally co-planar relation to) the contact surface. The attraction surface of the magnet is rectangularly shaped, with the magnet itself having either a rectangular or a square cross-sectional configuration. As an alternative to a single magnet, a series of magnets may be disposed within the base portion of the housing in end-to-end fashion such that the magnets collectively define the attraction surface.

In the locating device of the present invention, the magnet and the housing are sized relative to each other such that the force of magnetic attraction between the magnet and the stud, when the device is oriented in a particular location upon the wall, is sufficient to maintain the device thereon without any external support. Thus, in addition to being operative to assist in the location of a metallic stud embedded within a wall behind at least one layer of drywall or other wall surface, the present device may also be used to provide a visual reference point observable from any location within the room. In order to provide this capability, the device is constructed to maximize the force of magnetic attraction exerted by the magnet, while minimizing overall weight so as to be maintainable upon the wall as a result of such force of magnetic attraction. In this regard, the contact surface defined by the base portion of the housing has a surface area of approximately 3.14 square inches, with the attraction surface of the magnet having a surface area of approximately 0.86 square inches. As such, the proportion between the surface areas of the contact and attraction surfaces is about 27 percent. Additionally, the magnet has an overall weight of approximately 0.94 ounces, with the housing itself having an overall weight of approximately 0.58 ounces. Thus, the total weight of the device is only about 1.52 ounces, with approximately 62 percent of such weight being taken up by the magnet.

The locating device of the present invention may optionally include a pair of slide pads which are attached to the contact surface of the base portion adjacent respective ones of the opposed ends thereof. The slide pads preferably have circular configurations, and are fabricated from a soft, pliable material such as felt. The inclusion of the slide pads assists in the movement of the device along the wall and the prevention of scratches or other abrasive damage thereto. It will be recognized that the locating device of the present invention may also be used to locate metallic objects such as nails. Additionally, the device may be used to locate other metallic support elements other than for wall studs, such as ceiling joists, floor joists, etc.

BRIEF DESCRIPTION OF THE DRAWINGS

These, as well as other features of the present invention, will become more apparent upon reference to the drawings wherein:

FIG. 1 is a top perspective view of the locating device of the present invention;

FIG. 2 is a bottom plan view of the locating device shown in FIG. 1;

FIG. 3 is a top plan view of the locating device shown in FIG. 1;

FIG. 4 is a side-elevational view of the locating device shown in FIG. 1;

FIG. 5 is a front-elevational view of the locating device shown in FIG. 1, the rear-elevational view being identical thereto;

FIG. 6 is a cross-sectional view of the present device taken along line 6—6 of FIG. 4;

FIG. 7 is a cross-sectional view similar to FIG. 6, illustrating an alternatively configured magnet of the present device;

DETAILED DESCRIPTION OF THE INVENTION

Figure 8:
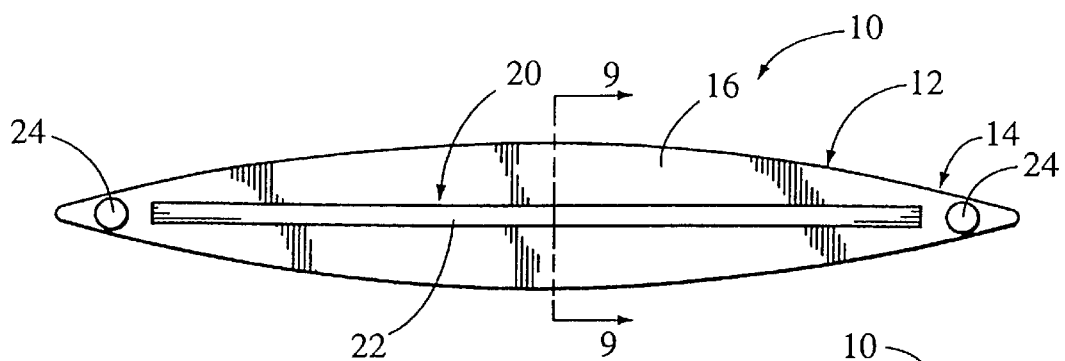
FIG. 8 is a bottom plan view similar to FIG. 2, illustrating a further alternatively configured magnet of the present device.

Referring now to the drawings wherein the showings are for purposes of illustrating preferred embodiments of the present invention only, and not for purposes of limiting the same, FIG. 1 perspectively illustrates a locating device 10 constructed in accordance with the present invention. As will be discussed in more detail below, the locating device 10 is particularly suited for determining the location of a metallic stud disposed within a wall, i.e., covered by at least one sheet of drywall, plywood, or other building material. However, the locating device 10 may also be used to determine the location of metallic ceiling or floor joists, or the location of nails within a wall, ceiling, or floor.

The locating device 10 comprises an elongate housing 12 which is preferably fabricated from a lightweight material. Examples of a suitable lightweight material include plastic, wood, and aluminum. The housing 12 itself comprises a base portion 14 which defines a lower, generally planar contact surface 16. In addition to the base portion 14, the housing 12 includes an elongate handle portion 18 which is integrally connected to and extends longitudinally along the base portion 14. As best seen in FIGS. 1–3, the base portion 14 and the contact surface 16 defined thereby each have a generally oval shape. As seen in FIGS. 3, 4 and 6, the handle portion 18 itself is cylindrically shaped having a generally circular cross-sectional configuration.

In addition to the housing 12, the locating device 10 comprises at least one elongate magnet 20 which defines a generally planar attraction surface 22. The magnet 20 is disposed within the base portion 14 of the housing 12 such that the attraction surface 22 extends in generally parallel relation to the contact surface 16. More particularly, the magnet 20 is preferably disposed within the base portion 14 such that the attraction surface 22 is substantially flush with (i.e., extends in generally co-planar relation to) the contact surface 16. As seen in FIG. 2, the attraction surface 22 of the magnet 20 is rectangularly shaped. Additionally, the magnet 20 itself may have either a rectangular cross-sectional configuration (FIGS. 6, 9 and 11) or a square cross-sectional configuration (FIG. 7).

Figure 9:
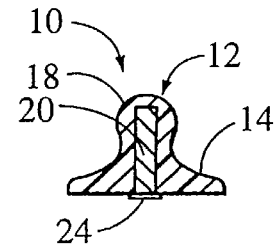
FIG. 9 is a cross-sectional view taken along line 9—9 of FIG. 8.
Figure 10:
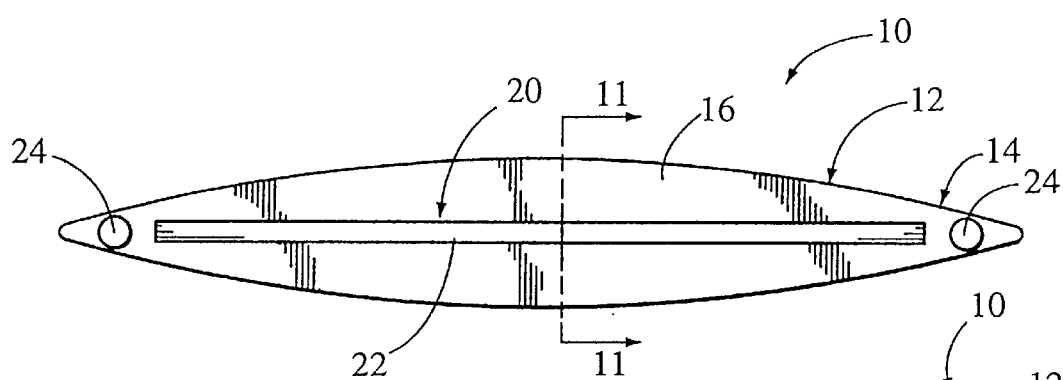
FIG. 10 is a bottom plan view similar to FIG. 8, illustrating a still further alternatively configured magnet of the present device.
Figure 11:
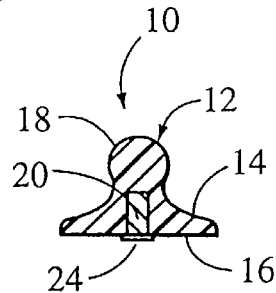
FIG. 11 is a cross-sectional view taken along line 11—11 of FIG. 10.

As seen in FIGS. 2, 6 and 8–11, the size of the magnet 20 is variable. More particularly, FIG. 6 illustrates the magnet 20 having a rectangular cross-sectional configuration and sized to extend into the handle portion 18 of the housing 12. FIG. 9 depicts the magnet 20 having a rectangular cross-sectional configuration and extending into the handle portion 18, but being of a reduced width as compared to the magnet 20 shown in FIG. 6. FIGS. 10 and 11 depict the magnet 20 as having a rectangular cross-sectional configuration and being of the same width of the magnet 20 shown in FIG. 9, but being of reduced height so as not to protrude into the handle portion 18 of the housing 12. As an alternative to a single magnet 20, a series of magnets may be disposed within the base portion 14 of the housing 12 in end-to-end fashion such that the magnets collectively define the attraction surface 22.

As seen in FIGS. 2, 8 and 10, the locating device 10 may optionally include a pair of circularly configured slide pads 24 which are attached to the contact surface 16 of the base portion 14 adjacent respective ones of the opposed ends thereof. The slide pads 24 are each preferably fabricated from a soft, pliable material such as felt. The inclusion of the slide pads 24 assists in the movement of the locating device 10 along a wall, ceiling or floor surface, and the prevention of scratches or other abrasive damage thereto.

As indicated above, in addition to being operative to assist in the location of a metallic object fully or partially embedded within a wall, floor or ceiling, the locating device 10 may also be used to provide a visual reference point observable from virtually any location within the room. In order to provide this capability, the locating device 10 is constructed to maximize the force of magnetic attraction exerted by the magnet 20, while minimizing overall weight so as to be maintainable upon a wall or ceiling as a result of such force of magnetic attraction. In this regard, the contact surface 16 defined by the base portion 14 has a surface area of approximately 3.14 square inches, with the attraction surface 22 of the magnet 20 (sized as shown in FIG. 2) having a surface area of approximately 0.86 square inches. As such, the proportion between the surface areas of the contact and attraction surfaces 16, 22 is about 27 percent. Additionally, the magnet 20 (as shown in FIGS. 2 and 6) has an overall weight of approximately 0.94 ounces, with the housing 12 having an overall weight of approximately 0.58 ounces. Thus, the total weight of the locating device 10 is only about 1.52 ounces, with approximately 62 percent of such weight being taken up by the magnet 20.

In the version of the magnet 20 shown in FIGS. 8 and 10, the area of the attraction surface 22 defined thereby is reduced to approximately 0.48 square inches. Additionally, the weights of those versions of the magnets 20 shown in FIGS. 7–11 differ from those of the magnet 20 shown in FIGS. 2 and 6 in that the magnet 20 shown in FIG. 7 weighs approximately 0.52 ounces, with the magnet 20 shown in FIG. 9 weighing approximately 0.52 ounces and the magnet shown in FIG. 11 weighing approximately 0.29 ounces.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A device for locating a metallic stud disposed within a wall, the device comprising:
    an elongate housing comprising:
       a base portion defining a generally planar contact surface; and
       a handle portion integrally connected to and extending from the base portion;
    at least one magnet defining a generally planar attraction surface, the magnet being disposed within the base portion of the housing such that the attraction surface extends in generally parallel relation to the contact surface;
    the magnet and the housing being sized relative to each other such that the force of magnetic attraction between the magnet and the stud when the device is oriented in a particular location upon the wall is sufficient to maintain the device thereon without external support.

2. The device of claim 1 wherein the at least one magnet comprises a series of magnets disposed within the base portion in end-to-end fashion such that the magnets collectively define the attraction surface.

3. The device of claim 1 wherein the magnet is disposed within the base portion such that the attraction surface is substantially flush with the contact surface.

4. The device of claim 1 wherein the contact surface has a generally oval shape and the attraction surface has a generally rectangular shape.

5. The device of claim 1 further comprising a pair of slide pads attached to the contact surface of the base portion.

6. The device of claim 1 wherein the housing is fabricated from a plastic material.

7. The device of claim 1 wherein the magnet has a generally rectangular cross-sectional configuration.

8. The device of claim 1 wherein the magnet has a generally square cross-sectional configuration.

9. The device of claim 1 wherein:
    the contact surface has a surface area of approximately 3.14 square inches; and
    the attraction surface has a surface area of approximately 0.86 square inches.

10. The device of claim 9 wherein:
    the magnet has an overall weight of approximately 0.94 ounces; and
    the housing has an overall weight of approximately 0.58 ounces.

11. A device for locating a metallic object, the device comprising:
    a housing defining a generally planar contact surface; and
    at least one magnet defining a generally planar attraction surface, the magnet being disposed within the housing such that the attraction surface extends in generally parallel relation to the contact surface;
    the magnet and the housing being sized relative to each other such that the force of magnetic attraction between the magnet and the metallic object when the device is oriented in a particular location adjacent to the metallic object is sufficient to maintain the device in the location without external support;
    wherein the housing comprises:
       a base portion defining the contact surface; and
       a handle portion integrally connected to and extending from the base portion.

* * * * *